United States Patent
Nitta et al.

[19]

[11] Patent Number: 6,061,886
[45] Date of Patent: May 16, 2000

[54] TURBINE BLADE FITTING APPARATUS AND FITTING METHOD

[75] Inventors: Masao Nitta; Ko Namiki; Tokio Kikuchi, all of Sayama, Japan

[73] Assignee: Honda Giken Kogyo Kabushiki Kaisha, Tokyo, Japan

[21] Appl. No.: 09/108,036
[22] Filed: Jun. 30, 1998

[30] Foreign Application Priority Data

Jul. 11, 1997 [JP] Japan .................................. 9-186879
Jul. 11, 1997 [JP] Japan .................................. 9-186887

[51] Int. Cl.[7] .................................................. B23P 17/00
[52] U.S. Cl. ...................................... 29/23.51; 29/889.21
[58] Field of Search ................... 29/23.51, 821, 29/889.21

[56] References Cited

U.S. PATENT DOCUMENTS 5,257,442 11/1993 Tanaka et al. ........................ 29/23.51
5,666,724 9/1997 Kolsun .................................. 29/23.51
5,737,816 4/1998 Hartmann et al. ..................... 29/23.51

FOREIGN PATENT DOCUMENTS 7-14102 3/1995 Japan .

*Primary Examiner*—I. Cuda
*Attorney, Agent, or Firm*—Merchant & Gould P.C.

[57] ABSTRACT

A turbine blade fitting apparatus for fitting multiple turbine blades radially to a disc having multiple disc grooves formed in its periphery. A blade preassembly is made by preassembling multiple turbine blades into a ring by connecting together their tips. The fitting apparatus has a second pedestal for temporarily placing the blade preassembly so that the upper face of the blade preassembly is higher than the upper face of a disc supported horizontally on a first pedestal. The second pedestal is lowerably supported by compression springs. Base parts of the blades are completely fitted into the disc grooves by the blade preassembly being pushed downward by a pushing mechanism while being vibrated.

3 Claims, 10 Drawing Sheets

TURBINE BLADE FITTING APPARATUS AND FITTING METHOD

BACKGROUND OF THE INVENTION

1. Field of the Invention

This invention relates to an apparatus and a method for fitting multiple turbine blades (hereinafter called 'blades') radially to a disc.

2. Description of the Related Art

Known attachment structures for attaching multiple blades to a disc include for example the 'Moving Blade Attachment Structure' disclosed in Japanese Utility Model Laid-Open Publication No. HEI 7-14102.

In the following description, a turbine consisting of blades attached to a disc will be referred to as a 'turbine rotor'.

FIG. 11 hereof is a perspective view of part of a turbine rotor of related art. This turbine rotor 100 has a disc 101 and multiple blades 103 embedded in the outer circumferential face of the disc 101 so as to be restrained in the radial direction. Disc grooves 102 for attaching the blades 103 are formed in the outer circumferential face of the disc 101 with a uniform spacing in the circumferential direction, passing through the disc 101 diagonally with respect to its thickness direction. These disc grooves 102 are formed with wavy sides to support the blades 103 with respect to centrifugal forces acting radially outward on the blades 103 when they are rotated at high speeds. Fixing parts 103a with wavy sides for fitting into the disc grooves 102 are formed in base end parts of the blades 103. The turbine rotor 100 is constructed by the fixing parts 103a being fitted into the disc grooves 102 and tip end parts 104 of the blades 103 being connected together.

FIG. 12 is a view seen in the direction of the arrow 12 in FIG. 11 and illustrates that the disc grooves 102 are diagonal with respect to the thickness direction of the disc 101 and that the tip end parts 104, 104 are connected by mating projections and indentations.

With this turbine rotor 100, because the tip end parts 104 must be connected together and because the disc grooves 102 are formed diagonally, fitting the blades 103 to the disc 101 is not easy and requires skill.

While attachment structures for attaching blades to discs have been becoming more complex, improvements to fitting technology have lagged behind, and technology with which even an ordinary worker can fit blades to a disc easily has been being awaited.

SUMMARY OF THE INVENTION

A first aspect of the invention provides a turbine blade fitting apparatus for fitting multiple turbine blades radially to a disc having multiple disc grooves formed In its periphery, the apparatus comprising: a first pedestal for supporting the disc horizontally; a second pedestal for temporarily placing a blade preassembly made by preassembling the turbine blades into a ring by connecting together their tips at a position such that the upper face of the blade preassembly is higher than the upper face of the disc; an elastic member for lowerably supporting the second pedestal; and a pushing mechanism for fitting base parts of the turbine blades into the disc grooves by pushing down the blade preassembly on the second pedestal from above.

With this fitting apparatus, because the disc is placed horizontally on a first pedestal and a blade preassembly is temporarily placed on a second pedestal and the blade preassembly is fitted to the disc by being pushed down by a pushing mechanism, fitting of the turbine blades to the disc can be carried out easily by an ordinary worker.

The pushing mechanism has a vibrating mechanism for vibrating the base parts of the turbine blades as they are fitted into the disc grooves. By the base parts of the turbine blades being vibrated by means of this vibrating mechanism as they are pushed into the disc grooves, they can be fitted smoothly following the angle of the disc grooves and there is no risk of the disc grooves or the base parts of the turbine blades being deformed or damaged.

The fitting apparatus also has an upper limit positioning mechanism for adjusting an upper limit position of the second pedestal. By means of this second pedestal upper limit positioning mechanism, an operation of shallowly fitting the base parts of the blade preassembly into the disc grooves before the turbine blade fitting apparatus is operated and an operation of removing the turbine blades and the disc after they are fitted together can be carried out efficiently.

A second aspect of the invention provides a turbine blade fitting method for fitting multiple turbine blades radially to a disc having multiple disc grooves formed in its periphery, comprising: a preassembling step of preassembling the multiple turbine blades into a ring by connecting together their tips; a tentative fitting step of shallowly fitting base parts of the preassembled turbine blades into the disc grooves; and a main fitting step of fitting the base parts into the disc grooves by pushing down the tentatively fitted turbine blades while vibrating them.

In the method of this invention, because the multiple turbine blades are preassembled into a ring and the turbine blades are tentatively fitted to the disc in this preassembled state, compared to a method wherein the turbine blades are fitted to the disc one at a time the fitting operation can be carried out efficiently and in a short time. Also, because the tentatively fitted turbine blades are vibrated as they are fitted to the disc, the turbine blades can be fitted into the disc grooves smoothly. As a result, fitting of the turbine blades to the disc can be carried out easily by an ordinary worker.

A fitting method according to the invention may further comprise an attaching step of attaching anchoring members to the base parts of the turbine blades before the tentative fitting step. In this case, anchoring members of the turbine blades can also be fitted to the disc at the same time as the turbine blades, and the manufacturing efficiency increases.

BRIEF DESCRIPTION OF THE DRAWINGS

A preferred embodiment of the present invention will now be described in detail, by way of example only, with reference to the accompanying drawings, in which.

DETAILED DESCRIPTION OF THE PREFERRED EMBODIMENTS

The following description is merely exemplary in nature and is in no way intended to limit the invention or its application or uses.

Figure 1:
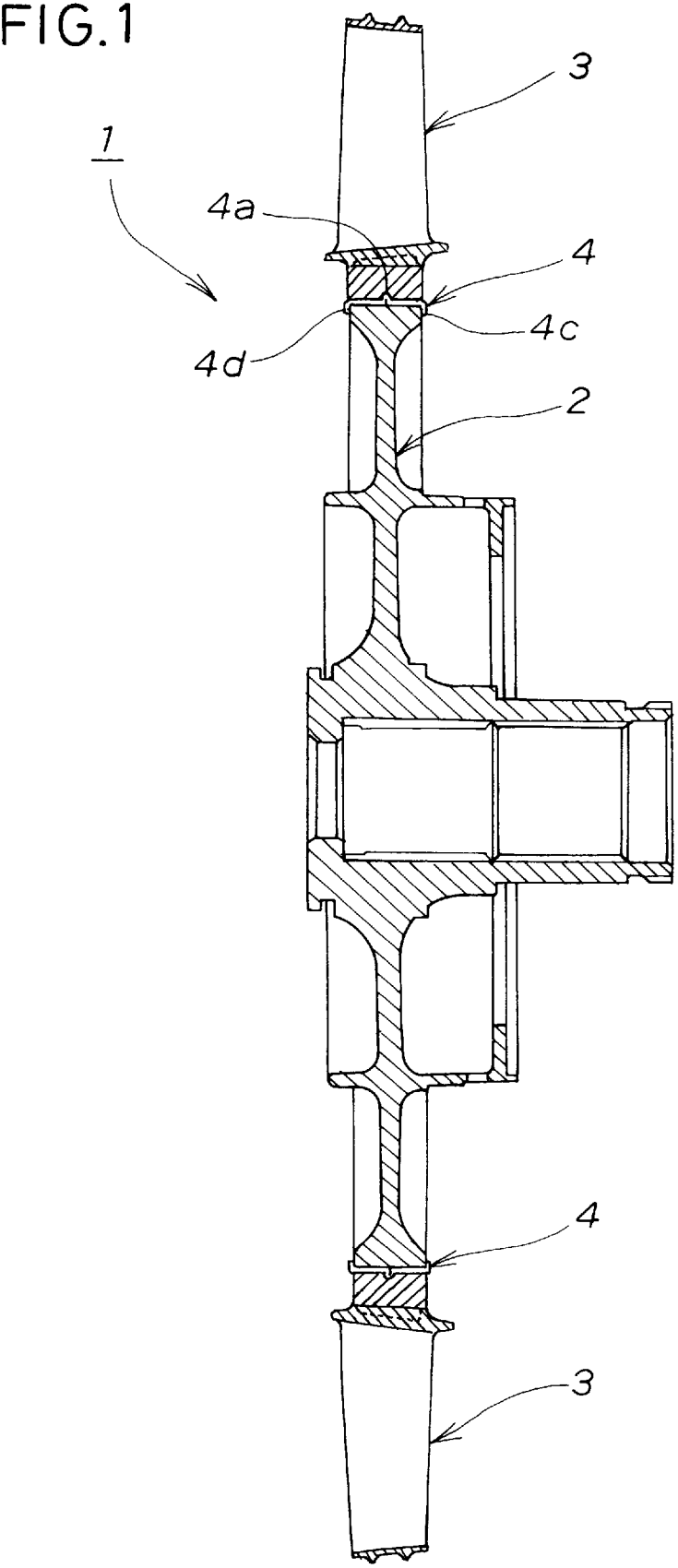
FIG. 1 is a sectional view of a turbine rotor used in the present invention.

Referring to FIG. 1, a turbine rotor 1 has a disc 2, multiple turbine blades (hereinafter referred to simply as 'blades') 3 radially attached to the disc 2, and blade anchoring pins 4 for preventing the blades 3 from falling out of the disc 2.

Figure 2:
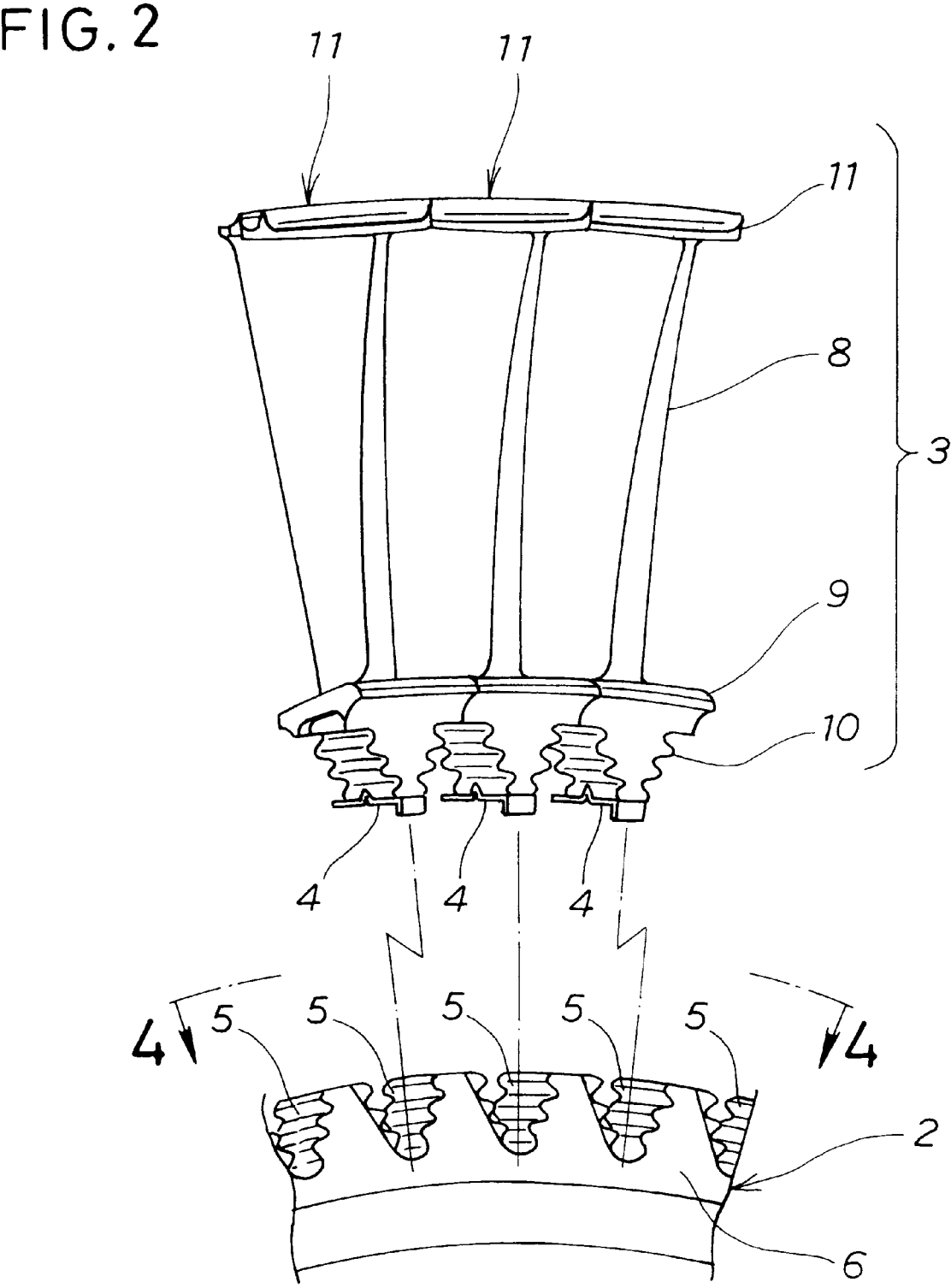
FIG. 2 is an exploded perspective view of a main part of the turbine rotor shown in FIG. 1.

Referring to FIG. 2, the disc 2 has disc grooves 5 formed with a uniform spacing in its periphery for attaching the blades 3 to the disc 2. The disc grooves 5 have wavy sides and pass through the disc 2 in its thickness direction. The blades 3 are each made up of a fin 8, a platform 9 at the base of the fin 8, a base part 10 formed below the platform 9 and having wavy sides for fitting into one of the above-mentioned disc grooves, and a shroud 11 attached to the tip of the fin 8.

Figure 3:
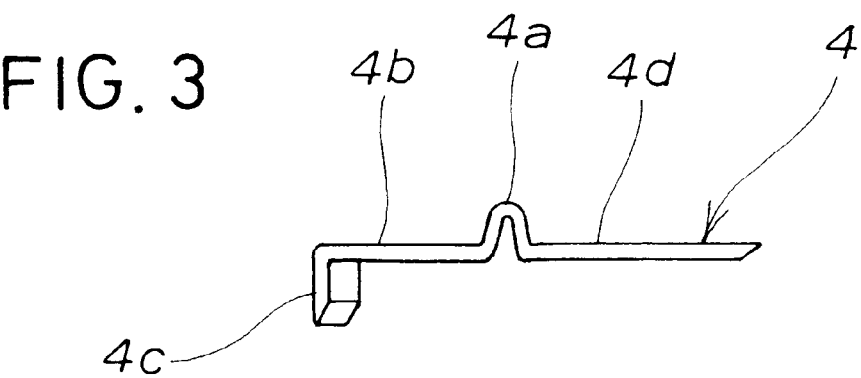
FIG. 3 is a side view of a blade anchoring pin shown in FIG. 2.

FIG. 3 shows one of the above-mentioned blade anchoring pins 4. This blade anchoring pin 4 is made by working a strip-shaped plate and consists of a projecting part 4a formed by folding the plate in the center, a straight part 4b extending from one side of the projecting part 4a, a bent part 4c continuing from the straight part 4b, and another straight part 4d extending from the other side of the projecting part 4a. This blade anchoring pin 4 is constructed to anchor one of the blades 3 to the disc 2 by the projecting part 4a being fitted into a concavity formed in the bottom of the blade 3, the bent part 4c being hooked on the disc 2 and the straight part 4d then being bent, as shown in FIG. 1.

Figure 4:
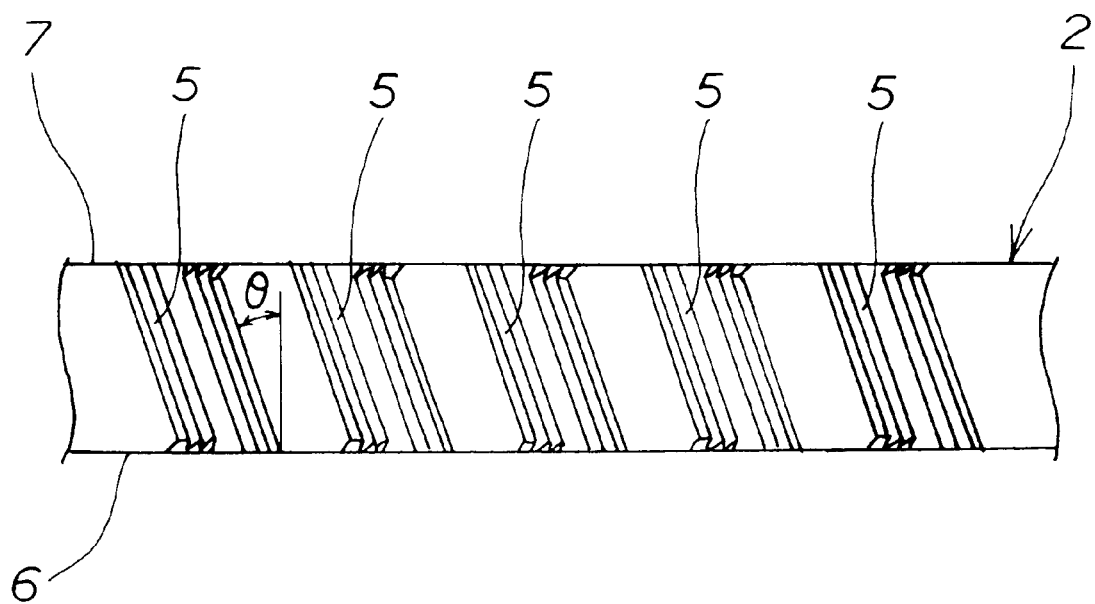
FIG. 4 is a view taken in the direction 4—4 in FIG. 2.

Referring to FIG. 4, the disc grooves 5 are wavy grooves formed between the front face 6 and the rear face 7 of the disc 2 so as to be diagonal to the thickness direction of the disc 2 by an angle θ in the counterclockwise direction as seen from the front face 6.

Figure 5:
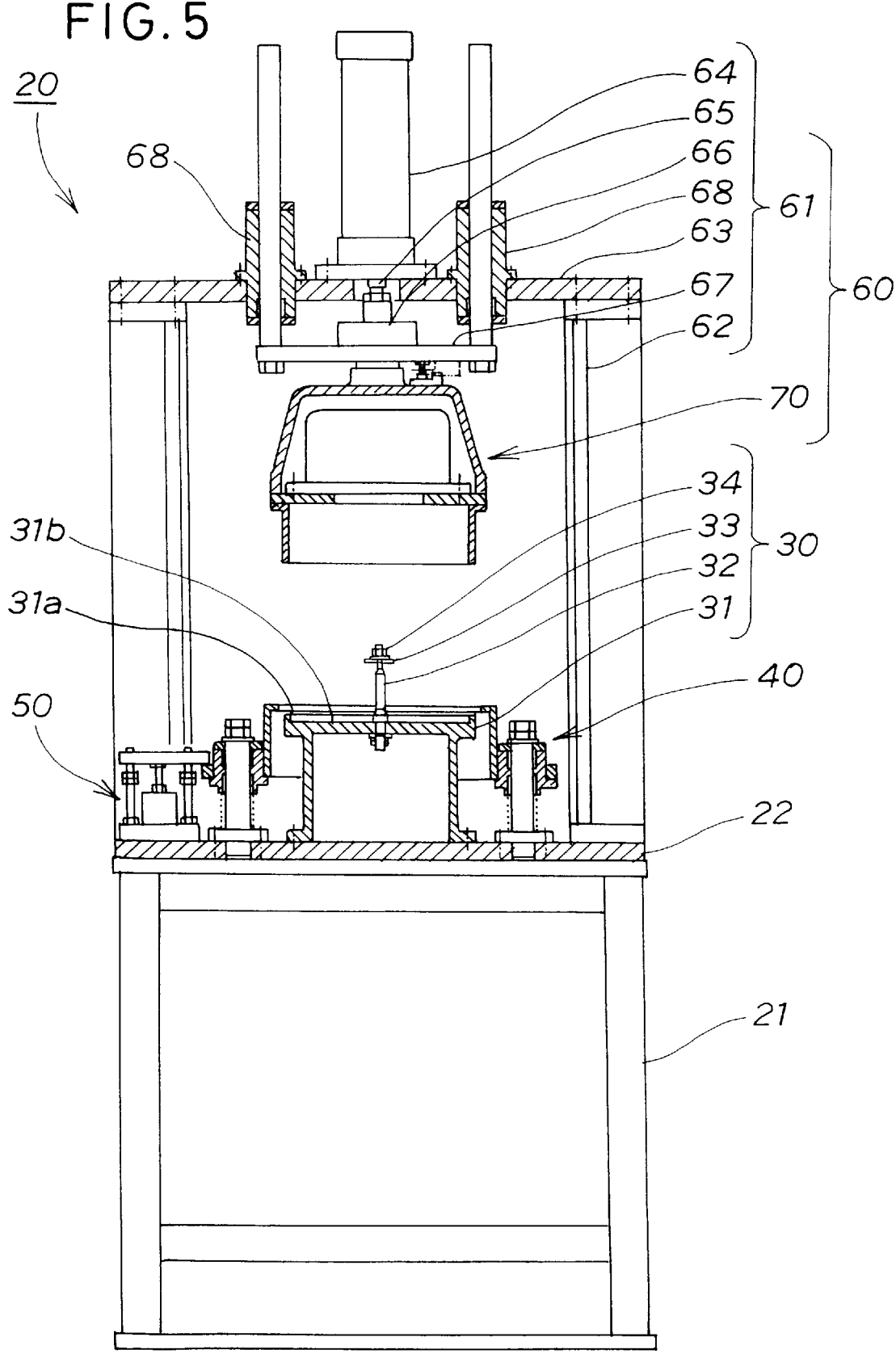
FIG. 5 is a sectional view of a turbine blade fitting apparatus according to the present invention.

FIG. 5 is a sectional view of a turbine blade fitting apparatus according to the invention.

In FIG. 5, a turbine blade fitting apparatus 20 has a stand 21, a mounting plate 22 on this stand 21, and mounted on this mounting plate 22 a first pedestal assembly 30, a second pedestal assembly 40, an upper limit positioning mechanism 50, and a pushing mechanism 60.

The first pedestal assembly 30 is made up of a first pedestal 31, a fixed shaft 32 attached to the center of the top of this first pedestal 31, a washer 33 attached to this fixed shaft 32, and a nut 34. The first pedestal 31 has at its upper face an annular receiving surface 31a. The reference numeral 31b denotes a recessed part for supporting a central thick portion of a disc 2 when the disc 2 is placed horizontally on the first pedestal 31 (see FIG. 1).

The pushing mechanism 60 is made up of an upper pushing mechanism 61 and a lower pushing mechanism 70.

The upper pushing mechanism 61 is made up of a support stand 62, a support plate 63 mounted on the top of the support stand 62, a raising and lowering cylinder 64 mounted on the support plate 63, a piston rod 65 of the raising and lowering cylinder 64, a joint 66 attached to the end of the piston rod 65, a bearing plate 67 attached to the joint 66, and guides 68, 68 for guiding ascent and descent of the bearing plate 67.

Figure 6:
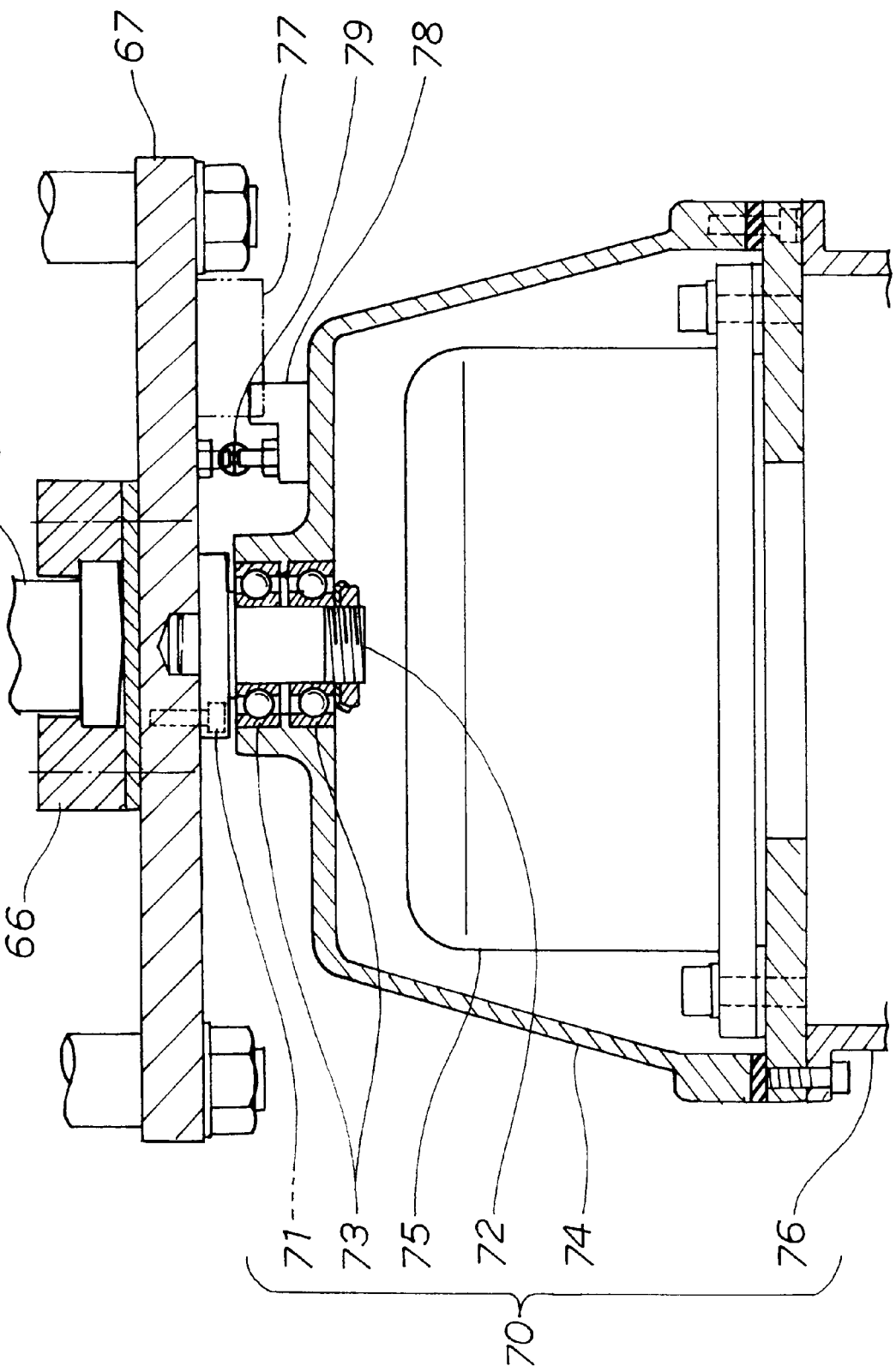
FIG. 6 is a sectional view showing details of a lower pressing mechanism shown in FIG. 5.

The lower pushing mechanism 70, as shown in detail in FIG. 6, has a pushing shaft 72 attached to the underside of the bearing plate 67 by a plurality of bolts 71 (of which only one is shown in the figure), a pushing frame 74 rotatably mounted on the pushing shaft 72 by way of a plurality of bearings 73, 73, a vibrating mechanism 75 mounted on this pushing frame 74, and a pushing piece 76 attached to the bottom of the pushing frame 74.

A turn-limiting block 77 for preventing the pushing frame 74 from rotating in a predetermined direction is provided on the underside of the bearing plate 67. This turn-limiting block 77 obstructs rotation of the pushing frame 74 by interfering with a turn-limiting plate 78 provided on an upper face of the pushing frame 74. The reference numeral 79 denotes a tension spring, and when pushing of the pushing frame 74 has finished and the pushing frame 74 is lifted this tension spring 79 returns the pushing frame 74 to its original position.

That is, because the disc grooves 5 formed in the periphery of the disc 2 as shown in FIG. 4 are each formed on a diagonal having an angle θ in the counterclockwise direction from the front face 6 to the rear face 7 of the disc 2, the turn-limiting block 77 and the turn-limiting plate 78 are provided for, while allowing the pushing frame 74 to turn through 360° in the direction in which the disc grooves 5 are formed, preventing rotation of the pushing frame 74 in the opposite direction.

Figure 7:
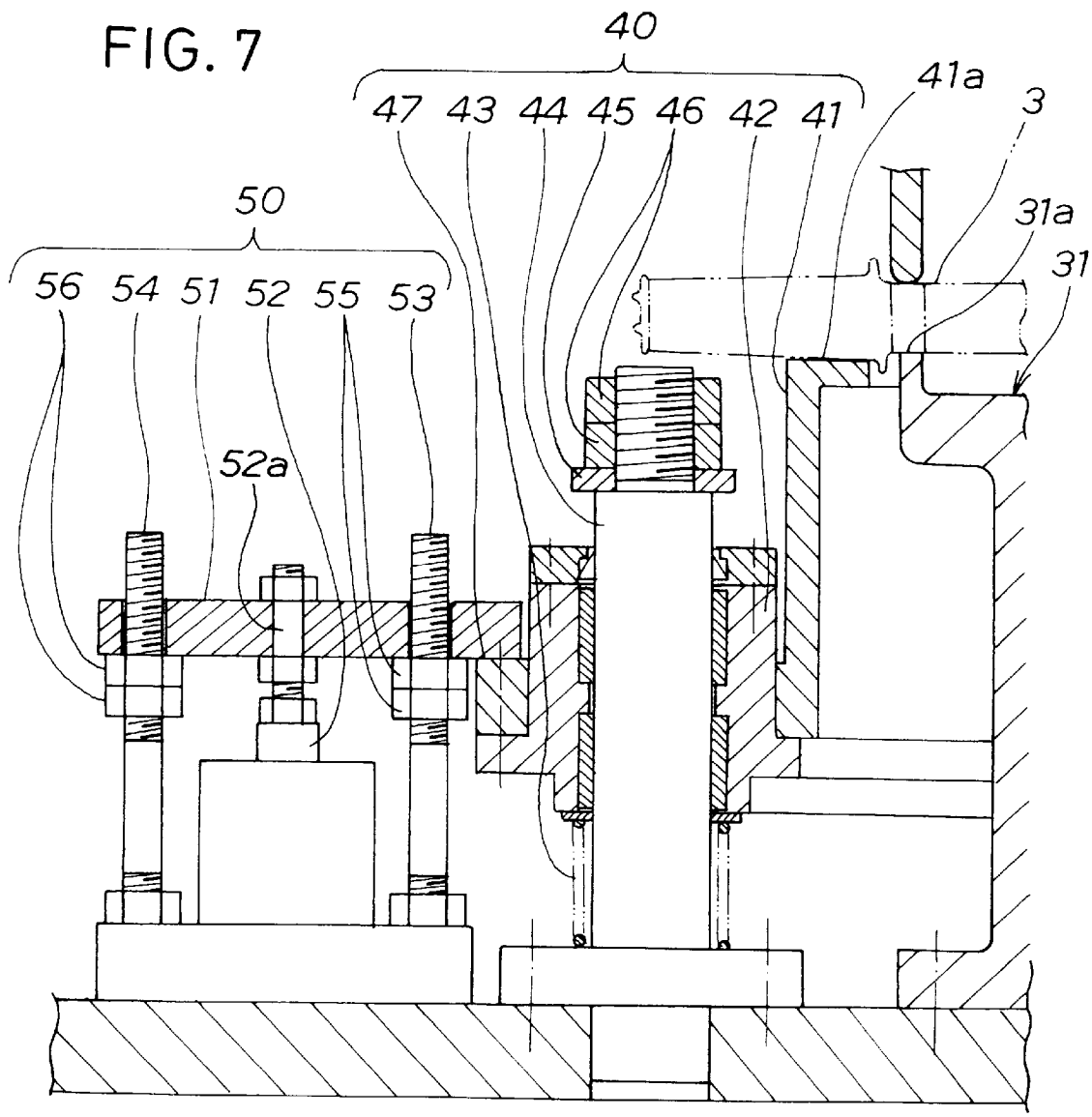
FIG. 7 is an enlarged sectional view showing the relation between the second pedestal assembly and the upper limit positioning mechanism as shown in FIG. 5.

In FIG. 7, the second pedestal assembly 40 is made up of a second pedestal 41, a pedestal bearer 42 for bearing this second pedestal 41, compression springs 43 serving as elastic members for urging the pedestal bearer 42 upward, guide shafts 44 to which the pedestal bearer 42 and the compression springs 43 are fitted, snap rings 45 and nuts 46, 46 fitted to the tops of the guide shafts 44, and a spacer 47 connecting the pedestal bearer 42 with the upper limit positioning mechanism 50.

The second pedestal 41 is cylindrical and surrounds the first pedestal 31. An upper face 41a of the second pedestal 41 is for having multiple blades 3 connected in a ring placed upon it.

The pedestal bearer 42 is annular. This pedestal bearer 42 is disposed around the outside of the second pedestal 41 and supports the bottom of the second pedestal 41.

Because the pedestal bearer 42 supporting the bottom of the second pedestal 41 is guided by the guide shafts 44 and supported by the compression springs 43, the second pedestal 41 can move up and down with the upper face 41a of the second pedestal 41 remaining parallel with the receiving surface 31a of the upper face of the first pedestal 31. That is, the second pedestal 41 ascends and descends along with ascent and descent of the pedestal bearer 42.

The upper limit positioning mechanism 50 is made up of a positioning plate 51, a cylinder 52 for raising and lowering this positioning plate 51, guide bolts 53, 54 provided on both sides of the cylinder 52 for guiding the ascent and descent of the positioning plate 51, and nuts 55, 55, 56, 56 screwed onto the upper parts of these guide bolts 53, 54 and serving as stoppers for limiting the descent of the positioning plate 51.

The upper limit positioning mechanism 50 limits the height position of the upper face 41a of the second pedestal 41. When the cylinder 52 is operated and the positioning plate 51 is moved up or down to a predetermined position, the vertical position of the pedestal bearer 42 is determined by way of the spacer 47, and the position of the upper face 41a of the second pedestal 41 is determined as a result of the position of the pedestal bearer 42 being determined. When a piston rod 52a of the cylinder 52 for raising and lowering the positioning plate 51 is extended to its maximum stroke the positioning plate 51 is at an upper limit position. The lower limit position of the positioning plate 51 is the position at which the lower face of the positioning plate 51 abuts with the upper faces of the nuts 55, 56.

Next, the operation of this turbine blade fitting apparatus and a turbine blade fitting method will be described.

Figure 8:
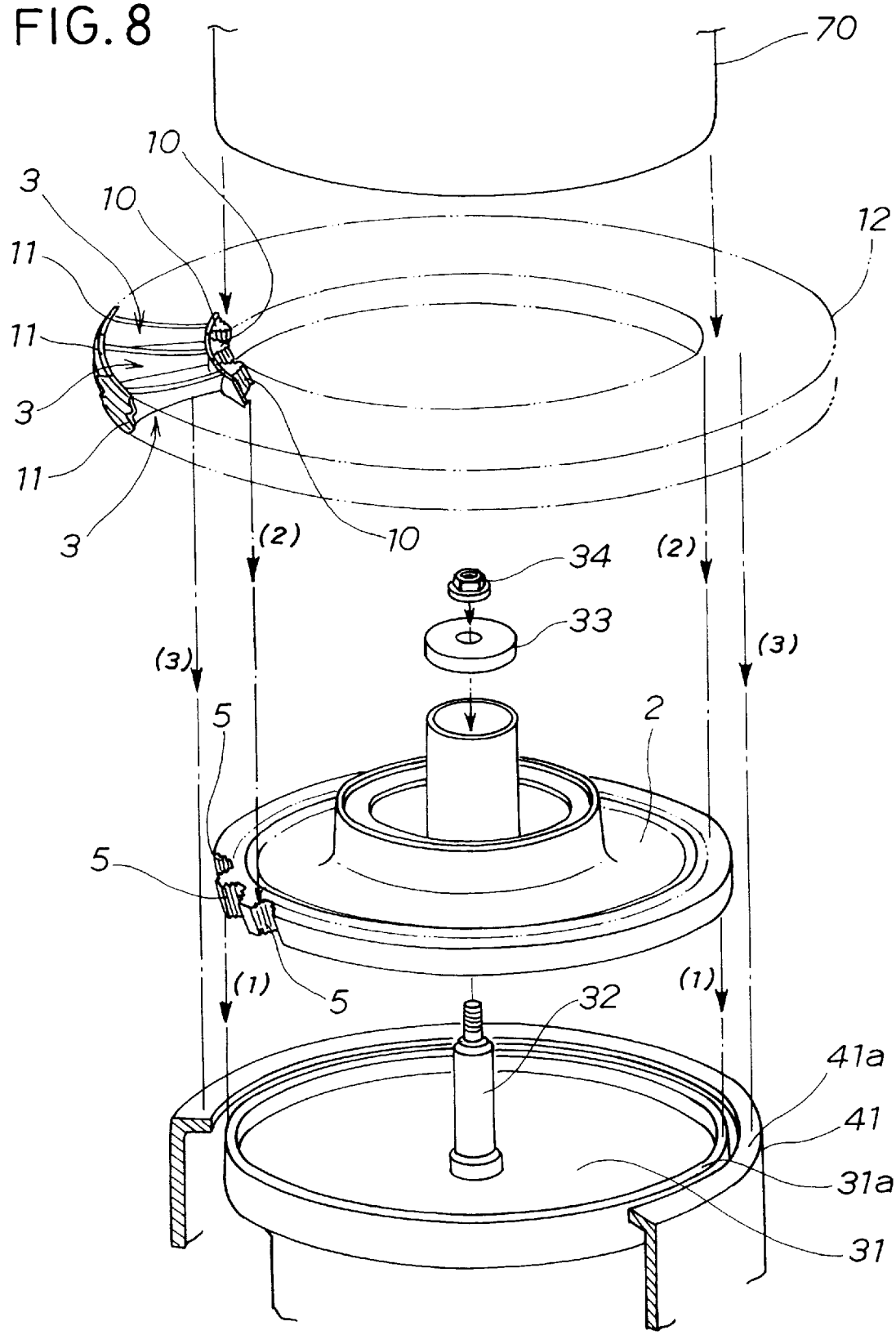
FIG. 8 is a first view illustrating a turbine blade fitting method according to the present invention.

FIG. 8 is a first view illustrating a turbine blade fitting method according to the invention.

Referring to FIG. 8, a disc 2 of first pedestal 31 is fitted onto the fixed shaft 32 and the periphery of the disc 2 is placed on the ring receiving surface 31a of the first pedestal 31 as shown by the arrows (1), and by screwing the nut 34 onto the end of the fixed shaft 32 via the washer 33, the disc 2 is tentatively tightened on the first pedestal 31, whereby the disc 2 is loosely fixed to the first pedestal 31.

Also, a blade preassembly step of making a blade preassembly 12 by linking multiple blades 3 in a ring by connecting together the shrouds 11 provided at the tips of the blades 3 is carried out. Since this blade preassembly step consists solely of connecting together the shrouds 11 at the tips of the blades 3, the operation is easy.

Next, a tentative fitting step of shallowly fitting the base parts 10 of the blades 3 of the blade preassembly 12 into the disc grooves 5 is carried out, as shown by the arrows (2), and the blade preassembly 12 is placed on the upper face 41a of the second pedestal 41, as shown by the arrow (3).

Thus in this invention, because the multiple blades 3 are preassembled into a ring and then this blade preassembly 12 is tentatively fitted into the disc grooves 5 of the disc 2, the fitting operation can be carried out more efficiently and in a shorter time than when the multiple blades 3 are assembled to the disc 2 one at a time.

Figure 9:
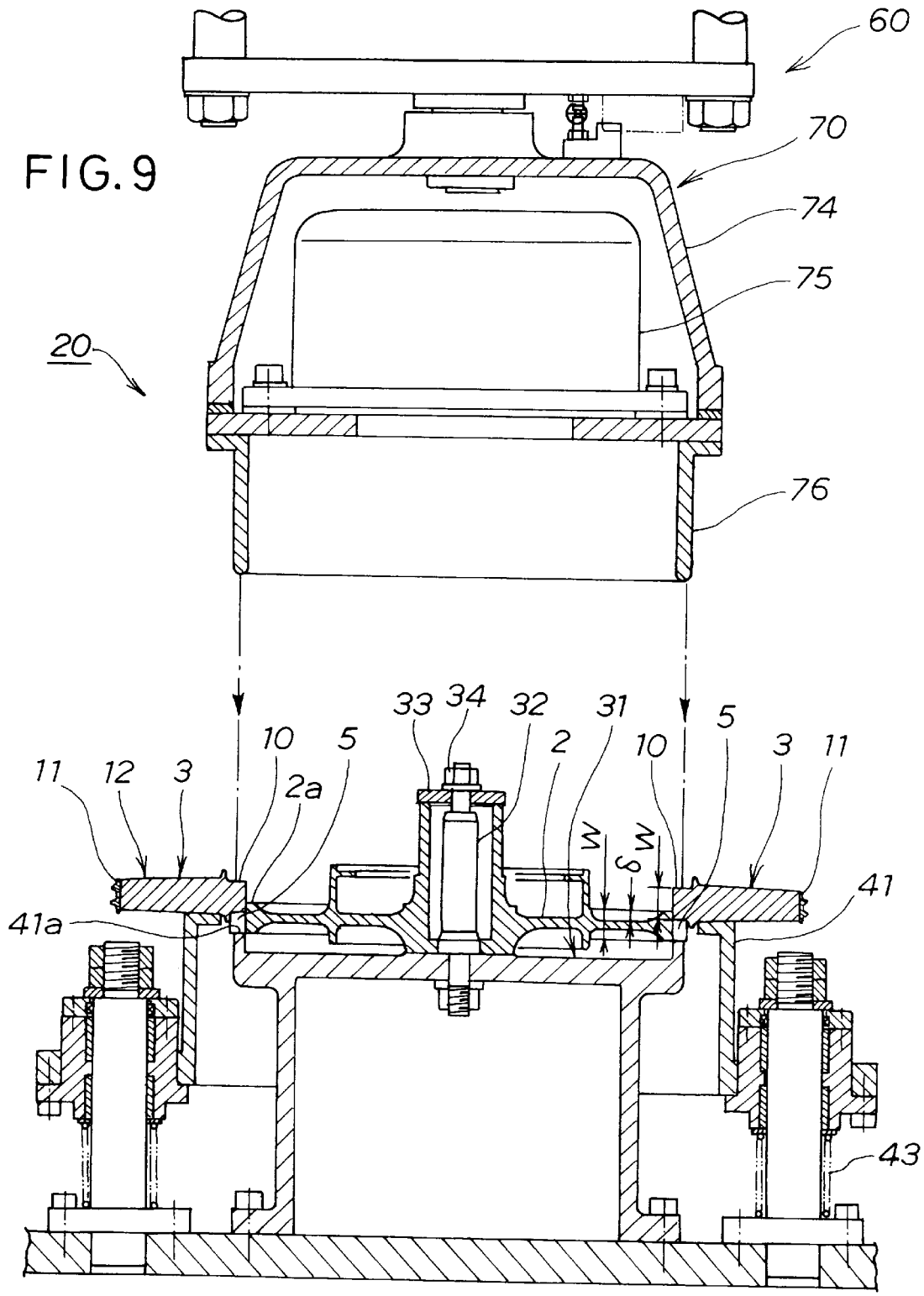
FIG. 9 is a second view illustrating the fitting method.

FIG. 9 shows the state of the turbine blade fitting apparatus 20 after the step of tentatively fitting the blade preassembly 12 to the disc 2.

In this figure, the symbol δ is a tentative fitting depth, and is the distance between the upper face 2a of the disc 2 and the lower faces of the base parts 10 of the blades 3 of the blade preassembly 12.

When the thickness of the disc grooves 5 and the base parts 10 is written W, the blades 3 of the blade preassembly 12 are temporarily placed on the second pedestal 41 at a position higher by (W-δ) than the disc 2.

Also, before this tentative fitting step, blade anchoring pins 4 are attached to the base parts 10 of the blades 3 as shown in FIG. 2. Thus, because the blade anchoring pins 4 can be attached to the disc 2 at the same time as the blades 3, the manufacturing efficiency rises.

When the blade preassembly 12 is tentatively fitted to the disc 2, as a result of the blade preassembly 12 being placed on the second pedestal 41, it is possible to check whether or not the blade preassembly 12 has been tentatively fitted in parallel with the disc 2 placed on the first pedestal 31. After this tentative fitting, the nut 34 on the end of the fixed shaft 32 is firmly tightened and the disc 2 is thereby fixed to the first pedestal 31.

Figure 10:
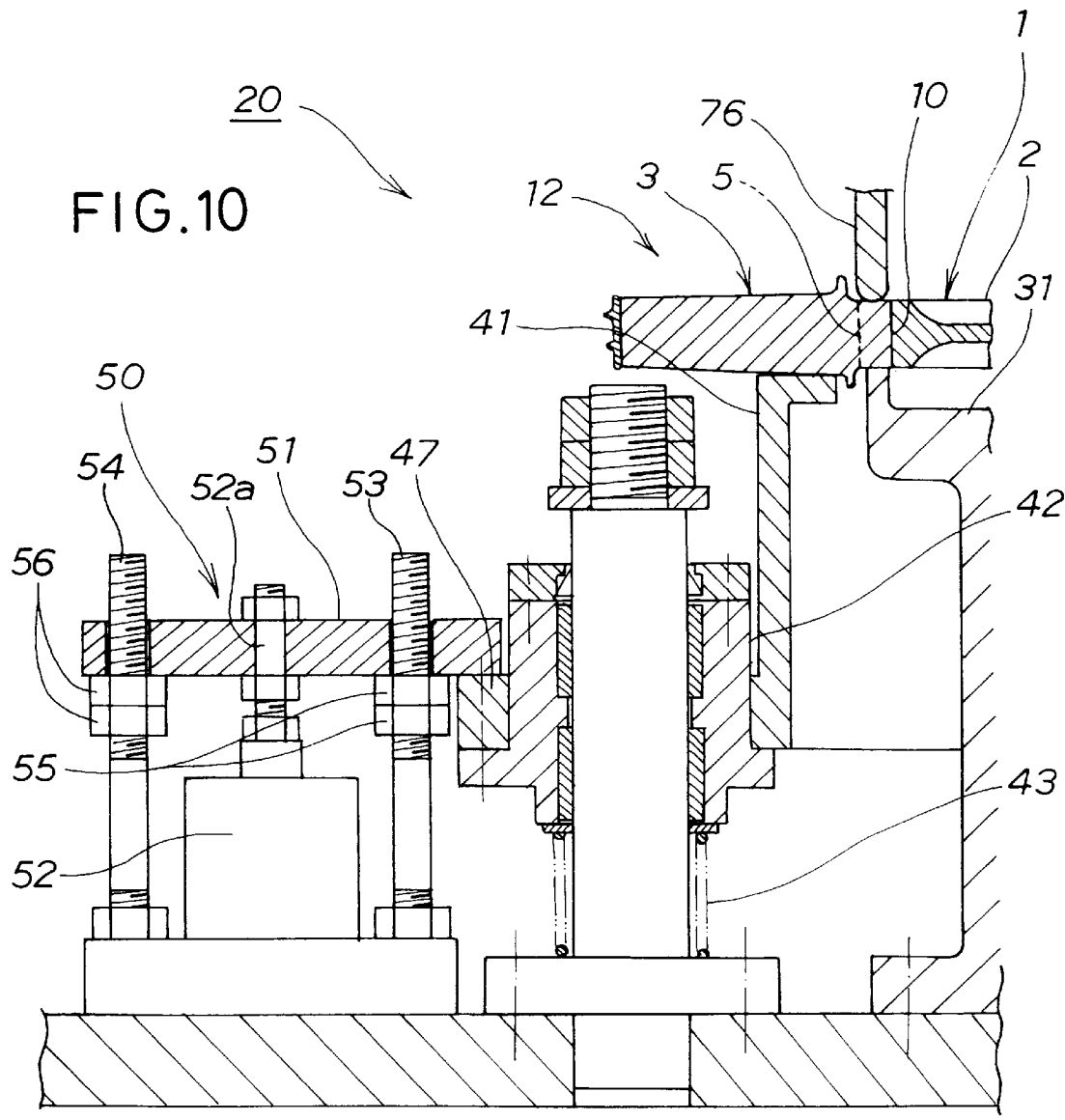
FIG. 10 is a third view illustrating the fitting method.
Figure 11:
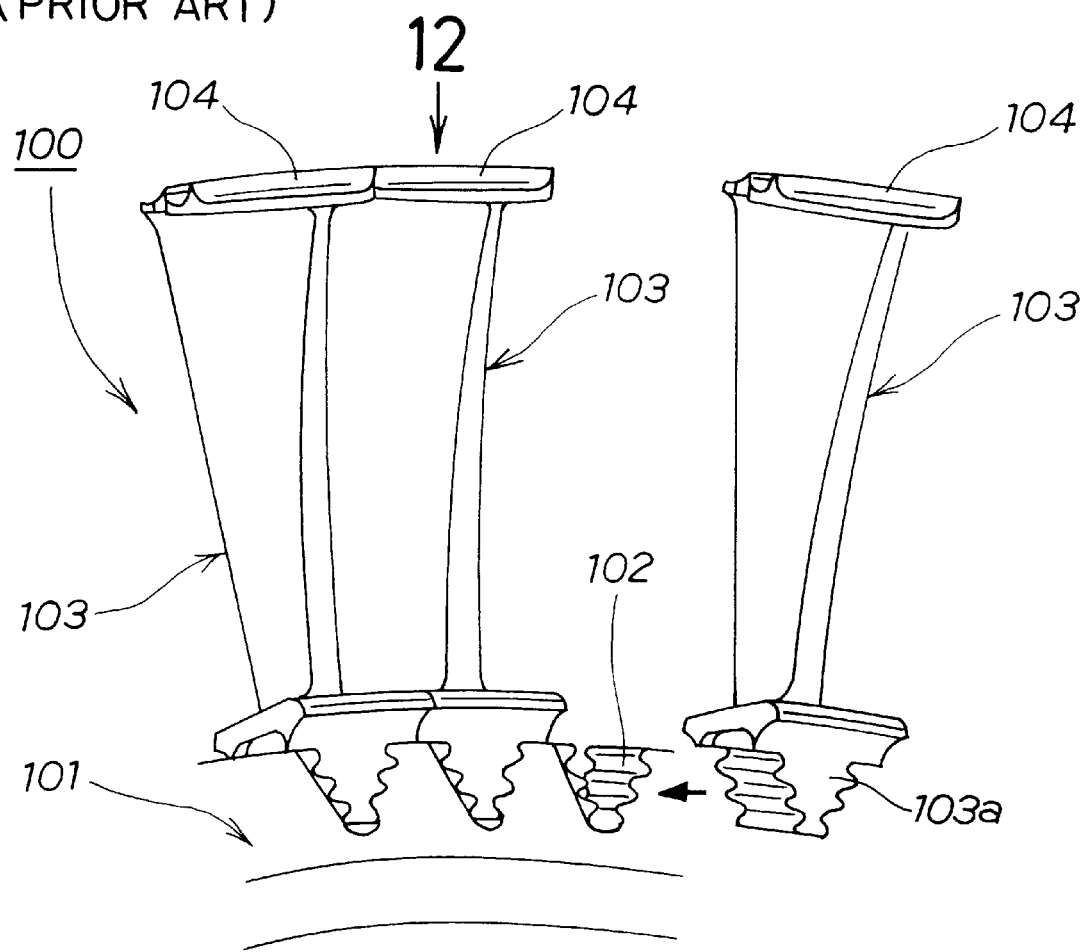
FIG. 11 is a perspective view of a part of a turbine rotor in related art.
Figure 12:
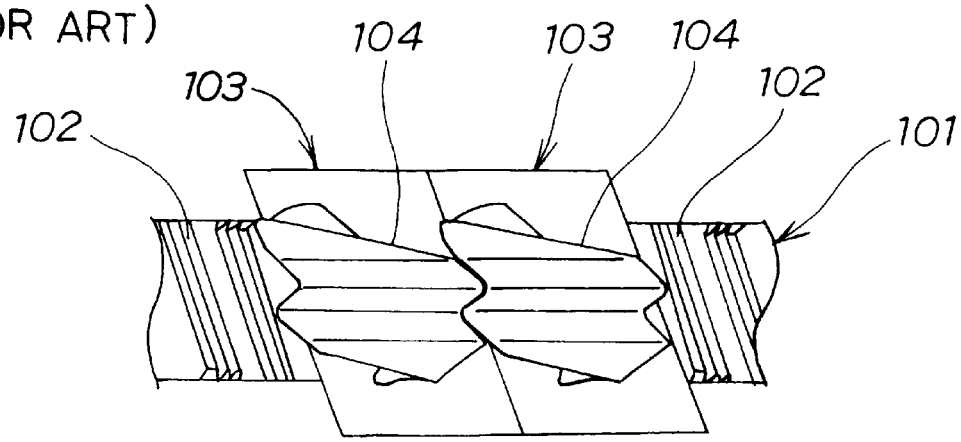
FIG. 12 is a view as seen in the direction of the arrow 12 in FIG. 11.

FIG. 10 shows a main fitting step in which the blades 3 are fitted to the disc grooves 5 by being pushed downward while being vibrated.

This main fitting step is carried out after the tentative fitting step.

The main fitting step is a step of bringing the pushing piece 76 into abutment with the base parts 10 of the blades 3 of the blade preassembly 12 and pushing the pushing piece 76 downward by means of the raising and lowering cylinder 64 (see FIG. 5) while vibrating the pushing piece 76 using the vibrating mechanism 75 (see FIG. 6) and thereby fitting the base parts 10 into the disc grooves 5.

Because the tentatively fitted blades 3 are vibrated in this way while this main fitting step is carried out, the blades 3 can be fitted into the disc grooves 5 smoothly.

As a result of the base parts 10 of the blades 3 of the blade preassembly 12 placed on the second pedestal 41 being pushed down from above by the pushing mechanism 60 (see FIG. 5), the blade preassembly 12 remains parallel with the disc 2 placed on the first pedestal 31 as it descends. Consequently, the base parts 10 of the blades 3 fit uniformly into the disc grooves 5 and there is no risk of fitting being impossible.

At the time of this main fitting step, as shown in FIG. 6 the pushing frame 74 can turn about the pushing shaft 72. Consequently, the pushing piece 76 attached to the pushing frame 74 turns as the diagonal base parts 10 of the blades 3 of the blade preassembly 12 turn slightly as they fit into the disc grooves 5 provided diagonally in the periphery of the disc 2. As a result of this turning of the pushing piece 76, the base parts 10 of the blades 3 fit into the disc grooves 5 without hindrance.

When the main fitting step is completed, the cylinder 52 of the upper limit positioning mechanism 50 is operated and the positioning plate 51 is thereby lowered on the guide bolts 53, 54 until it abuts with the upper faces of the nuts 55, 55, 56, 56 and holds down the upper face of the spacer 47. As a result of the upper face of the spacer 47 being held down in this way, even when the pushing piece 76 rises, upward movement of the pedestal bearer 42 and the second pedestal 41 supported by the compression spring 43 is prevented.

Because upward movement of the second pedestal 41 is prevented in this way, the operation of removing the turbine rotor 1 of which attachment of the blades 3 to the disc 2 has been completed from the turbine blade fitting apparatus 20 can be carried out efficiently.

After that, the raising and lowering cylinder 64 (see FIG. 5) is operated to raise the pushing piece 76 to its standby position and the assembled blades 3 and disc 2 are removed from the turbine blade fitting apparatus 20.

Finally, by the piston rod 52a of the cylinder 52 being extended to its maximum stroke, the second pedestal 41 is raised by the elastic force of the compression springs 43 by way of the pedestal bearer 42 and returns to its initial position. When the second pedestal 41 returns to its initial position, an optimal tentative fitting depth 6 (see FIG. 9) can be maintained and a next tentative fitting step can be carried out efficiently.

Obviously, various minor changes and modifications of the present invention are possible in the light of the above teaching. It is therefore to be understood that within the scope of the appended claims, the present invention may be practiced otherwise than as specifically described.

What is claimed is:

1. A turbine blade fitting apparatus for fitting multiple turbine blades radially to a disc having multiple disc grooves formed in its periphery, said turbine blades having base parts and tips, the apparatus comprising:

a first pedestal for supporting the disc horizontally, said disc supported thereby having an upper face;

a second pedestal for temporarily holding a blade preassembly, said blade preassembly having an upper face, said blade preassembly being made by preassembling the turbine blades into a ring by connecting together the tips at a position such that the upper face of the blade preassembly is higher than the upper face of the disc;

an elastic member for lowerably supporting the second pedestal; and a pushing mechanism for fitting the base parts of the turbine blades into the disc grooves by pushing down the blade preassembly on the second pedestal from above.

2. A fitting apparatus according to claim 1, wherein the pushing mechanism comprises a vibrating mechanism for vibrating the base parts of the turbine blades as they are fitted into the disc grooves.

3. A fitting apparatus according to claim 1, further comprising an upper limit positioning mechanism for adjusting an upper limit position of the second pedestal.

* * * * *